United States Patent [19]

Holtslander

[11] Patent Number: 4,825,701
[45] Date of Patent: May 2, 1989

[54] STRAIN MEASUREMENT DEVICE

[75] Inventor: Roger A. Holtslander, Mt. Clemens, Mich.

[73] Assignee: Wolf Engineering Corporation, Dearborn, Mich.

[21] Appl. No.: 125,119

[22] Filed: Nov. 25, 1987

[51] Int. Cl.⁴ .............................................. G01L 1/00
[52] U.S. Cl. .................................. 73/782; 73/862.64
[58] Field of Search ................ 73/763, 766, 769, 773, 73/774, 781, 782, 779, 786, 780, 1 B, 722, 735, 826, 862.54, 862.62, 862.63, 862.64, 862.47, 862.48, DIG. 3, 765, 4 R, 1 C

[56] References Cited

U.S. PATENT DOCUMENTS

| 753,015 | 2/1904 | Tretch | 73/782 |
|---|---|---|---|
| 3,028,754 | 4/1962 | Huyser | 73/782 |
| 3,899,922 | 8/1975 | Mercer, Jr. | 73/782 |
| 3,914,991 | 10/1975 | Fletcher et al. | 73/782 |
| 4,586,576 | 5/1986 | Inoue | 73/779 |
| 4,644,785 | 2/1987 | Doyle | 73/781 |
| 4,667,514 | 5/1987 | Baer | 73/779 |
| 4,685,338 | 8/1987 | Bonfils | 73/782 |
| 4,715,211 | 12/1987 | Lehoczky | 73/1 C |

FOREIGN PATENT DOCUMENTS 1162597 2/1964 Fed. Rep. of Germany ... 73/DIG. 3

OTHER PUBLICATIONS

IMS Injection Machine Flyer Entitled "Tie Bar Strain Testing Gauges".

Primary Examiner—Stewart J. Levy
Assistant Examiner—Robert R. Raevis
Attorney, Agent, or Firm—Harness, Dickey & Pierce

[57] ABSTRACT

A strain measurement device to determine the amount of clamping force or pressure developed in a machine from the small amount of linear movement which results from strain on a predetermined part of the machine, such as a tie bar. The strain measurement device features an elongated arm which will pivot in response to such strain movement and amplify or magnify the amount of this strain movement. The strain measurement device also includes a sensing unit which will measure the amplified strain movement, and a circuit for converting this measurement into a signal indicative of force.

10 Claims, 4 Drawing Sheets

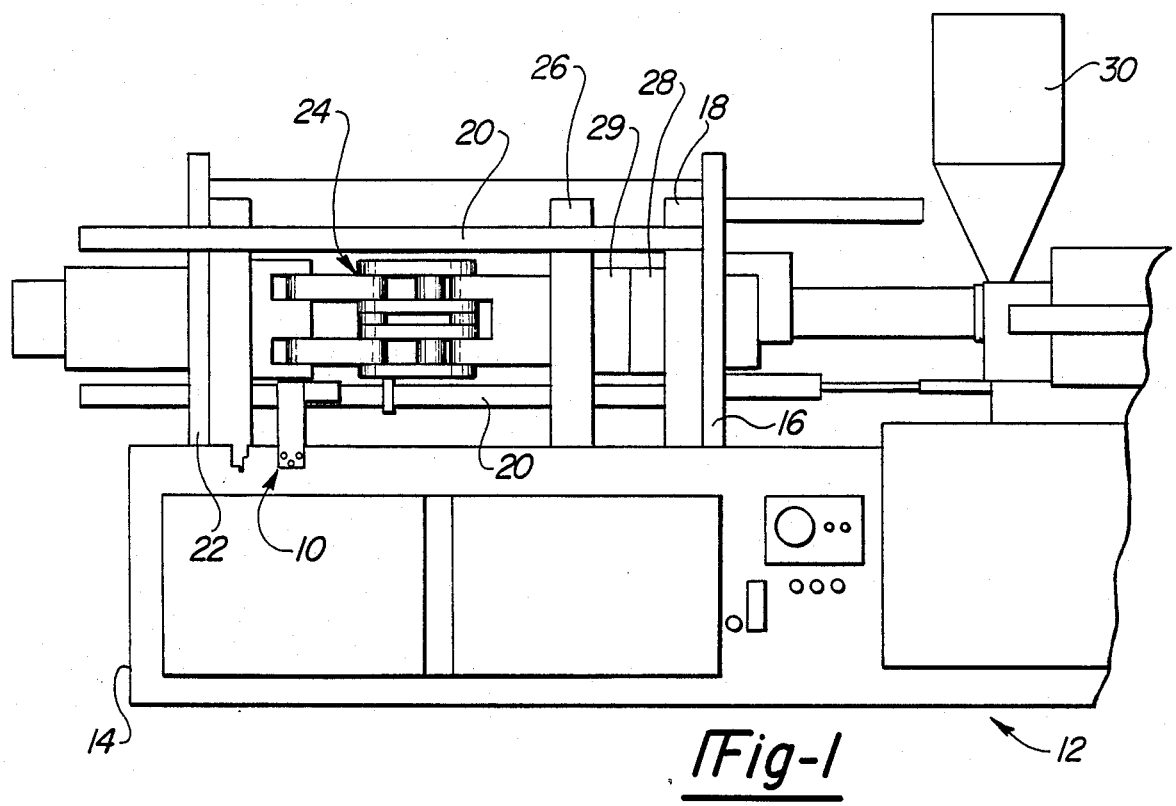
_Fig-1_
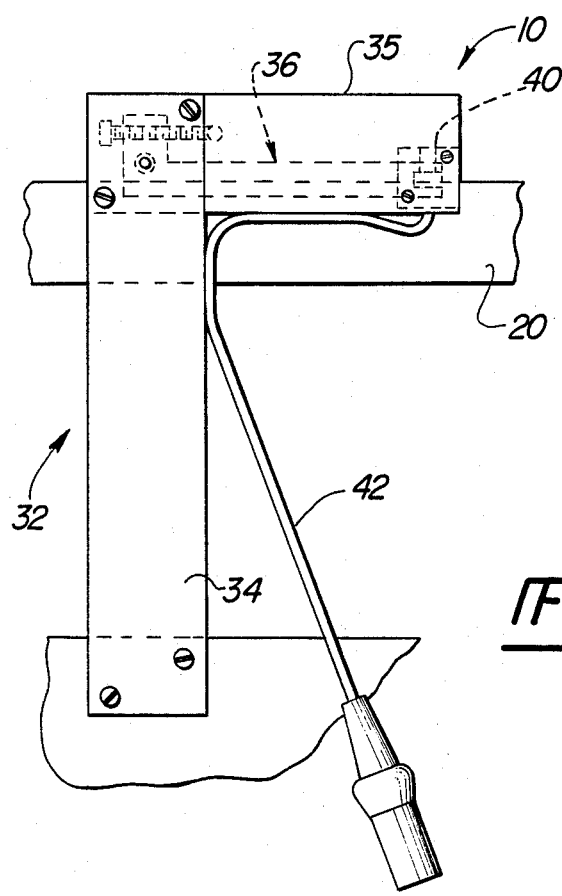
_Fig-2_

4,825,701

STRAIN MEASUREMENT DEVICE

BACKGROUND AND SUMMARY OF THE INVENTION

The present invention relates generally to devices for measuring very small amounts of movement and, more particularly, to a device which is capable of measuring mechanical strain and converting this measurement into an indication of applied force.

In injection molding, die casting, or the like arts, it is generally desirable to know the amount of clamping force being applied to the die pair which makes up the mold. Aside from the fact that such knowledge will help to avoid excessive force from being placed onto the dies, the amount of clamping force may also affect the quality of the parts being formed in the mold.

Generally, machines used for injection molding, die casting, or the like have a four tie bar design, wherein each bar is positioned near a corner of a square, movable platen. A suitable clamping device is also provided to move this platen toward a stationary platen. As the platens, which contain the dies, are forced together to form a mold, the tie bars stretch in a substantially linear fashion. In this regard, manufacturers of such machines typically provide the user with information on expected tie bar stretch or deflection parameters. Generally speaking, elastic tie bar deflection will range from about 22 to about 25 one-thousandths of an inch for a molding machine capable of producing a clamping force of 200 tons.

Thus, there is a need in the art to accurately determine the strain in such tie bars, and convert this strain information into a force measurement for display to the operator or for transmission to a machine controller. By having reliable information on the force exerted on the dies, the operator or controller can assure that the mold will repeatedly produce consistent parts over many cycles, even if the mold is placed in another molding machine.

Some manufacturers do offer optional pressure sensors that can be incorporated into their injection molding machines to sense the amount of hydraulic force exerted on the die pair during the clamping and lock up condition of the platens. However, this type of sensor mechanism is somewhat difficult to utilize due to the fact that the operator must precisely record the hydraulic pressure at the very instant the lock up condition occurs to obtain an accurate reading of the force applied on the dies. Additionally, this mechanism is relatively expensive and is very sensitive to fluctuations in hydraulic pressure.

Another type of sensor mechanism used in the art includes a pair of magnetic bases associated with a tie bar and a dial indicator. As the tie bar stretches, the magnets move apart and a gauge, which is set in tons, determines the force exerted on the dies. However, the accuracy of this type of device is limited, and it must be carefully calibrated each time that it is used on different types of machines.

Accordingly, it is a principal objective of the present invention to provide a device which is capable of measuring very small amounts of relative movement, such as would result from the strain on an elongated member, and converting this measurement into an indication of a function related to this movement.

It is a more specific object of the present invention to provide a device which is capable of measuring linear movement resulting from strain on a metallic tie rod, and converting this measurement into an indication of the force being placed on this tie rod.

It is another object of the present invention to provide a strain measurement device which is capable of amplifying the movement resulting from the strain in order to obtain a more accurate reading.

It is an additional object of the present invention to provide a strain measurement device which is inexpensive, easy to calibrate and easy to install.

It is a further object of the present invention to provide a reliable strain measurement device which will generate a signal which can be used both to display an indication of force and provide an appropriate signal for input to a variety of process control systems.

To achieve the foregoing objectives, the present invention provides a unique strain measurement device which will mechanically amplify small relative movements, such as would result from the strain in a tie bar of a molding machine. In general, the device comprises an elongated member which will pivot in response to the stretching movement of the tie bar, a sensing unit for measuring the movement of the elongated member and a circuit for determining the amount of force from the relative movement measured by the sensing unit.

From the subsequent detailed description of the preferred embodiment and appended claims taken in conjunction with the accompanying drawings, other objects and advantages of the present invention will become apparent to one skilled in the art.

BRIEF DESCRIPTION OF THE DRAWINGS

FIG. 1 is a side elevational view of an injection molding machine which is equipped with a strain measurement device in accordance with the present invention.

FIG. 2 is an enlarged side elevational view of a strain measurement device in accordance with the present invention.

DETAILED DESCRIPTION OF THE PREFERRED EMBODIMENT

Figure 3:
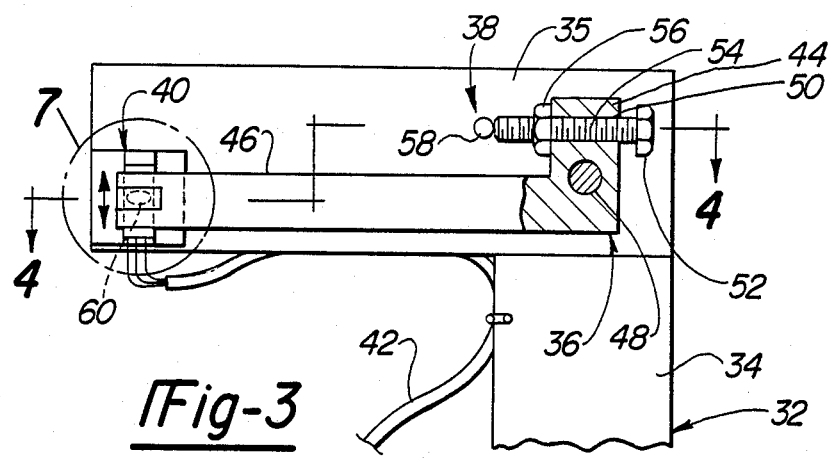
FIG. 3 is a side elevational view of the interior of the strain measurement device.

Referring to the Figures, a strain measurement device according to the present invention is illustrated and designated with the reference numeral 10. In FIG. 1, the strain measurement device 10 is shown to be mounted to the side of an injection molding machine 12. While the strain measurement device 10 is described in connection with the injection molding machine 12, it should be understood that the present invention may be employed in other suitable machines or applications.

Broadly stated, the injection molding machine 12 includes a base 14 having a generally vertically disposed support member 16 with a stationary platen 18 mounted to it. A set of four parallel tie rods 20 project in a horizontal direction from the platen 18 and support member 16. A second vertical support member 22 is positioned near the free extending ends of the tie rods 20. A toggle clamp device 24 is interposed between the second support member 22 and a second platen 26 which is movable in response to the actuation of the toggle clamp device. A first die 28 is mounted to the stationary platen 18, while a second opposing die 29 is mounted to the movable platen 26.

In operation, the die pair 28 and 29 are forced together by the hydraulic actuation of the toggle clamp device 24, whereupon plastic from the hopper 30 is heated and injected into the die pair 28 and 29 in order to form a part corresponding to the cavities of the dies. After a sufficient period of time required to form the part, the dies 28 and 29 are separated by a reverse actuation of the toggle clamp device 24. This reverse actuation causes the platen 26 to move along the tie rods 20 away from the platen 18, and thereby separate the dies 28 and 29 from each other. The part is then ejected from the die pair 28 and 29 and collected.

For a better understanding of the strain measurement device 10, reference is made to FIGS. 2 and 3. As previously stated, the strain measurement device 10 is used to measure the linear deflection of the tie rods 20, and convert this measurement into an indication of the force being applied to the tie rods during the actuation of the toggle clamp device 24. The strain measurement device 10 includes a frame 32 which is mounted to the base 14 or other suitable stationary part of the injection molding machine 12 which will not hinder the operation of the toggle clamp 24. The frame 32 is generally comprised of two plate members 34 and 35 which are coupled together by conventional fasteners to provide an L-shaped form for the frame.

Figure 4:
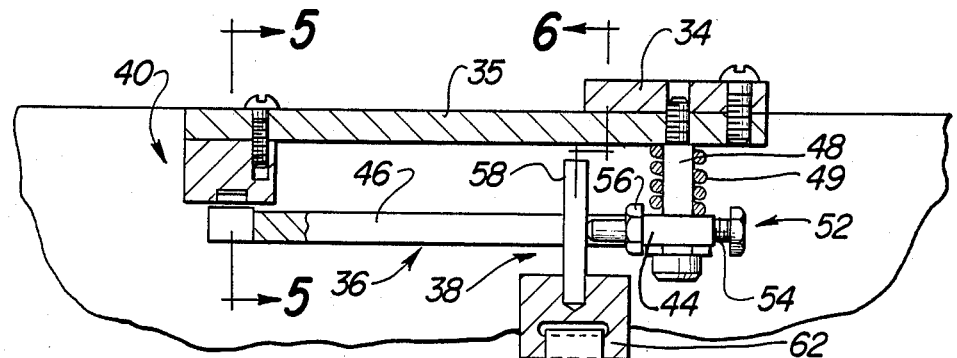
FIG. 4 is a partial cross-sectional view of the strain measurement device of FIG. 3 taken along line 4—4 thereof, which particularly illustrates its association with a tie bar of the molding machine.

An elongated arm member 36 is pivotally mounted to the frame 32, as seen in FIGS. 3 and 4, such that it extends generally in the same direction as the tie rods 20. A carriage mechanism 38 for actuating the elongated arm member 36 is mounted on the nearest tie bar 20. A sensing unit 40 is positioned at the free or cantilever end of the elongated arm member 36. The sensing unit 40 includes a transducer for producing a signal indicative of the magnitude of the pivoting movement of member 36, and a circuit for determining the strain in the tie bar 20, as will be explained herein. A supply line 42 is also associated with the unit 40 to supply power to the unit and to transmit an output signal from the unit indicative of force to a digital panel meter display.

The movable elongated arm member 36 includes a first transverse portion 44 and a second elongated portion 46 which together provides the member 36 with an overall L-shape. While an L-shape is preferred, it should be appreciated that other suitable shapes may be provided in the appropriate application. A pivot pin 48 is positioned approximately at this "L" junction to connect the elongated arm member 36 with the frame 32. A spring 49 is coaxially disposed around the pivot pin 48 between the frame 32 and elongated arm member 36 to enable member 36 to freely pivot or rotate about the pin 48 at a distance from the frame. The elongated arm member first portion 44 includes a threaded bore 50 which receives a threaded zeroing mechanism 52. The zeroing mechanism 52 generally includes a bolt 54 and a safety nut 56. It should be noted that the bolt 54 extends in a direction which is generally parallel to the elongated portion 46 of the member 36. The zeroing mechanism 52 contacts a pin 58, carried on the tie bar 20, to adjust the setting of elongated arm member 36, as will be explained herein. It should also be noted that both the pin 58 and the sensing unit 40 are positioned off the same side of the transverse portion 44 of the arm member 36.

Figure 5:
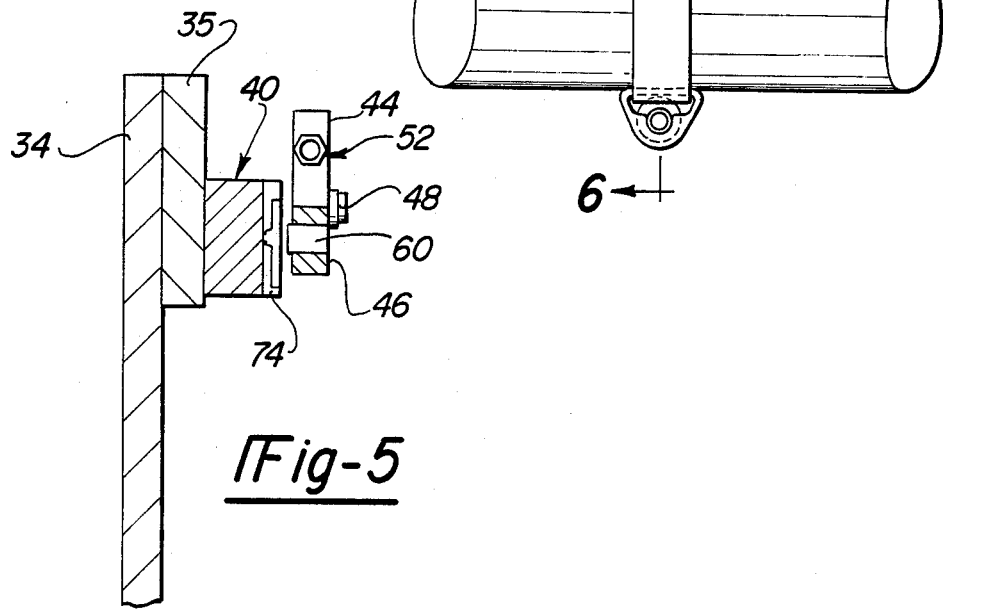
FIG. 5 is a cross-sectional view of the sensing unit of FIG. 4 taken along line 5—5 thereof.

The second portion 46 of the elongated arm member 36 includes a sensing element 60 which may be a conventional magnet or the like which can easily be sensed by the sensing unit 40. The sensing element 60 is positioned at the free end of the second portion 46 and is a desired size so that it can readily interact magnetically with the sensing unit 40 as seen in FIGS. 3 and 5. The second portion 46 of the member 36 is preferably manufactured from a nonmagnetic material, such as aluminum, so that it will not interfere with the functioning of the sensing element 60.

The second portion 46 of the member 36 has a length such that when the member 36 pivots in response to linear movement of the pin 58 relative to the frame 32, the magnitude of this linear movement will be magnified or amplified approximately four times at the free end of the elongated portion 46. It should be appreciated that other suitable amplification factors may be provided to heighten the sensitivity of the measurement.

Thus, as the pin 58 moves linearly with respect to the frame 32, its engagement with the zeroing mechanism 52 will cause the member 36 to pivot about pin 48. This pivoting movement will in turn, displace the free end of the second portion 46 and its sensing element 60 in a substantially linear vertical direction with respect to the sensing unit 40 as seen in FIGS. 3 and 5. It should also be noted that since the second portion is disposed below the pin 58, the weight of the second portion 46 will cause the member 36 to return to its starting position when the tie rod 20 is in an unstrained position. In other words, the strain measurement device 10 is designed such that a return spring is not required. It should also be appreciated that the positions of the sensing element 60 and sensing unit 40 could be switched, such that the sensing unit 40 moves relative to a fixed sensing element 60.

Figure 6:
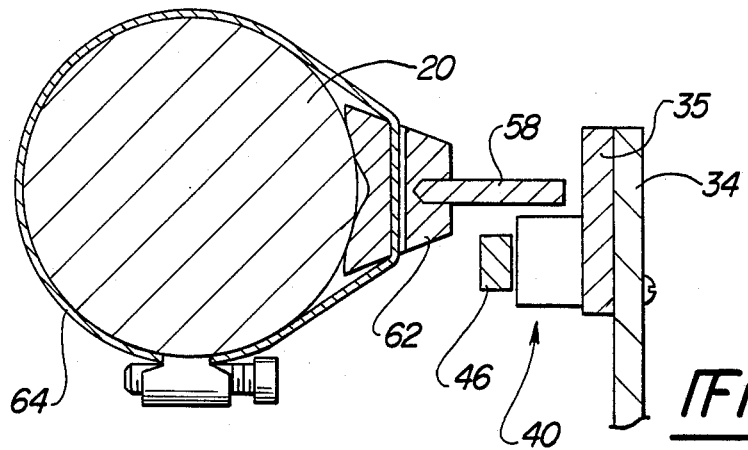
FIG. 6 is another cross-sectional view taken along line 6—6 of FIG. 4.

The carriage mechanism 38 is best seen in FIGS. 4 and 6. The mechanism 38 generally includes a base member 62, pin 58, and clamp 64. The clamp 64 is passed through the base 62 to position the mechanism 38 about a tie bar 20. The carriage mechanism 38, by being positioned about the tie rod 20, does not interfere with the structural properties of the tie bar 20. The clamp 64 is tightened around the tie bar 20 so that the pin 58 is at a stationary position when the tie bar 20 is in a resting or unstrained position. As the tie bar 20 stretches, due to the strain in the tie bar 20, the pin 58 will move linearly with the tie bar 20. Generally, the pin 58 will move about 20 to 25 one-thousandths of an inch from a resting position to a fully loaded position. This movement is magnified or amplified, as explained above, so that the sensing element 60 will move in the range of about one-tenth of an inch.

Figure 7:
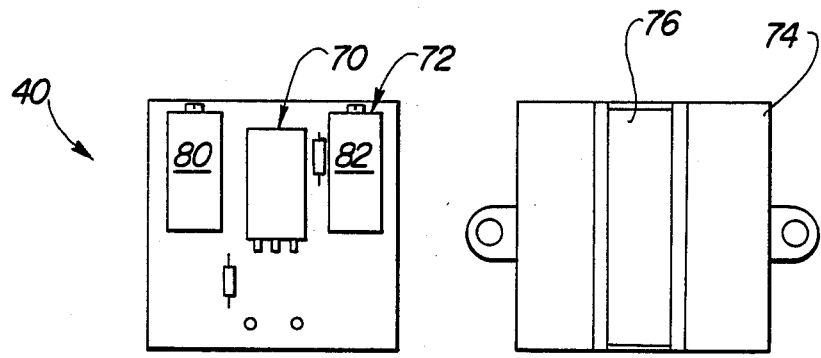
FIG. 7 is an enlarged side elevational view of a circuit connected with the sensing unit of FIG. 3 within circle 7 with the cover of the sensing unit removed.
Figure 8:
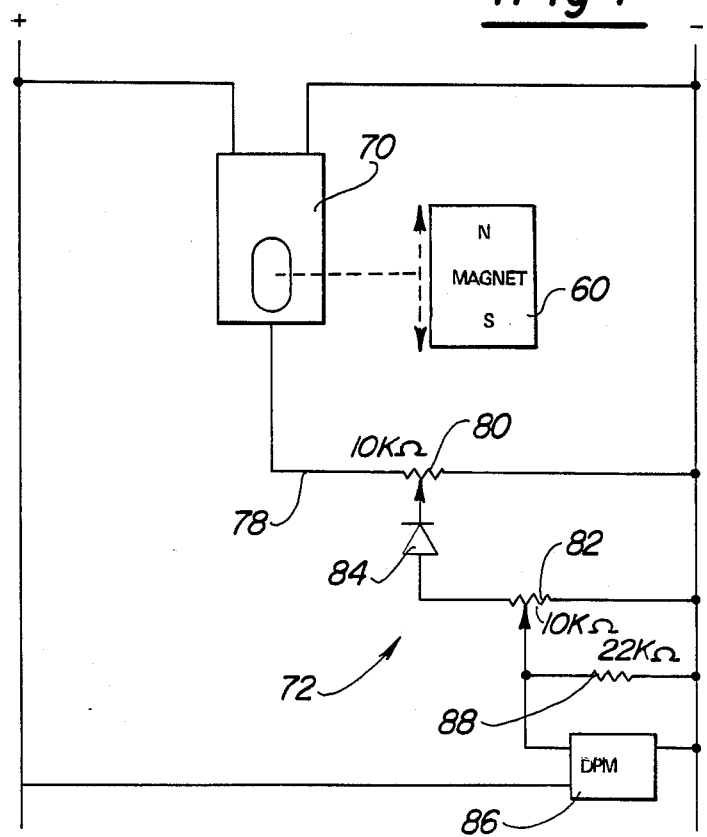
FIG. 8 is an electrical schematic diagram of a circuit in accordance with the present invention.

For a better understanding of the sensing unit 40, reference is made to FIGS. 7 and 8. The sensing unit 40 includes a transducer 70 and a circuit 72. The sensing unit 40 has a cover 74 which is formed with an aperture 76 to enable the sensing element 60 to interact magnetically with the transducer 70. The sensing unit 40 is also provided with a plastic or resin backing to provide heat dissipation for the transducer 70 and circuit 72.

Referring to FIG. 8, a schematic diagram of the circuit 72 is shown. The circuit receives an analog output signal from the transducer 70 on conductor 78. In one embodiment according to the present invention, the transducer 70 comprises a linear output hall effects transducer, sometimes referred to as a "LOHET." An example of one such LOHET is Microswitch Model No. 91SS12-2. However, it should be appreciated that other suitable transducers may be employed in the appropriate application.

The circuit 72 includes two variable resistors, namely potentiometers 80 and 82. The potentiometer 80 is used to achieve an electrical zero output from the circuit, while the potentiometer 82 is used to limit the maximum output from the circuit. Specifically, the potentiometer 80 acts in combination with a zener diode 84 to cancel the residual output voltage provided by the LOHET 70. In this regard, the potentiometer 80 will be adjusted at the zener threshold when the tie bar 20 is in a resting position. A digital panel meter 86 is also provided as a display device. A load resistor 88 is also connected across the panel meter 86. In the embodiment described, the output signal from the LOHET 70 does not need to be amplified in order to produce a suitable display on the panel meter 86 which may be calibrated in tons of applied force.

Before the strain measurement device 10 may be utilized on a particular machine, the elongated arm member 36 must be zeroed while the tie rods 20 are in a resting or unstrained position. Generally, zeroing is accomplished by adjusting zeroing mechanism 52 (i.e., turning bolt 54 in threaded bore 50) until the sensing element 60 is set in a desired position with respect to the transducer 70. As the zeroing mechanism 52 is adjusted, the sensing element moves up and down with respect to the transducer 70 as seen in FIG. 5. After a desired mechanical zero setting of the elongated arm member 36 is achieved, the circuit 72 is electronically zeroed so that the strain measurement device 10 will produce a zero reading at the resting position.

The following is a brief description of the functioning of the present invention in connection with the molding machine 12. The dies 28 and 29 are mounted on their respective platens 18 and 26. The platens 18 and 26 are then forced together by the injection molding machine toggle clamp device 24. As the die pair 28 and 29 are being clamped firmly together, the force on the tie rods 20 rapidly increases and the tie rods 20 begin to elastically stretch in a linear direction.

As the tie rods 20 stretch, the carriage mechanism 38 will move linearly with the tie rod 20. This linear movement of the mechanism 38 will actuate the member 36, via pin 58 contacting the zeroing mechanism 52. As this movement occurs, the member 36 will pivot about pin 48 and the free end of the second portion 46 will move in a substantially linear vertical direction with respect to the transducer 70. The transducer 70 will measure the movement of the sensing element 60 in the second portion 46 and transmit an output signal to the circuit 72.

The circuit 72 will convert the signal from the transducer to a signal which is indicative of the force exerted on the die pair 28 and 29. The circuit 72 will then transmit this signal to a suitable display device, such as the digital panel meter 86. The numerical amount of force displayed on the digital panel meter 86 will then enable an operator to adjust the operation of the molding machine accordingly. The signal from the circuit 72 could also be coupled to a suitable process control computer so that the information may be utilized to automatically control the molding process or provide a desired historical record of the machine's operation.

Figure 9:
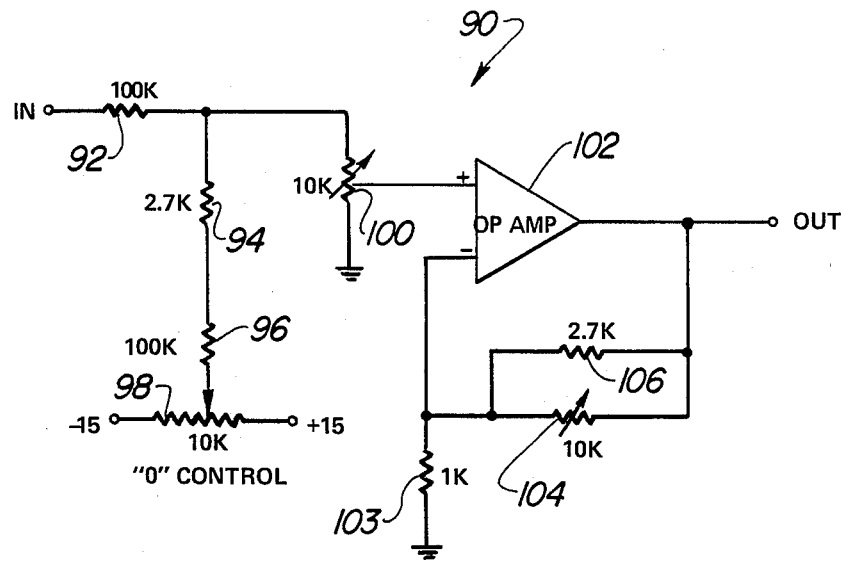
FIG. 9 is an electrical schematic diagram of another circuit in accordance with the present invention.

Referring to FIG. 9, a schematic diagram of a second circuit 90 is shown. The circuit 90 may be used generally in place of the circuit 72 when it is desired to provide a more temperature stable processing circuit which is also capable of amplifying the output signal from the LOHET 70. In this regard, the input terminal to the circuit 90 would be connected to the conductor 78, while the output terminal of the circuit would be connected to the digital panel meter 86.

The circuit 90 includes a resistor divider network (i.e., resistors 92-96) and a potentiometer 98 for achieving an electrical zero from the circuit when the tie bar 20 is in a resting position. Another potentiometer 100 is connected between the junction of the resistor divider network and ground to limit the maximum output from the circuit. One input from an operational amplifier 102 (e.g., NE5532) is connected to the potentiometer 100. A feedback loop is connected between the second input of the operational amplifier and its output. A resistor 103 is also connected between ground and the second input to the operational amplifier 102. The feedback loop is comprised of a potentiometer 104 and a resistor 106 connected in parallel with it. Accordingly, it should be appreciated that the operational amplifier is connected in a positive gain configuration, such that the potentiometer will control the magnitude at which the signal from the LOHET will be amplified.

While it is apparent that the preferred embodiment of the present invention is well calculated to fulfill the objects and advantages stated above, it will be appreciated that the invention is susceptible to modification, variation, and alteration with departing from the scope and fair meaning of the subjoined claims.

What is claimed is:

1. A strain measurement device for determining force as a function of strain movement, comprising:
    movable means for mechanically amplifying the amount of movement resulting from strain, said movable means including a stationary frame and an arm member mounted to said frame such that said arm member will pivot in response to said strain movement, said arm member including zeroing means for adjusting the position of said arm member;
    carriage means associated with an article being strained, such that said carriage means will move with said article as said article is being strained, said carriage means being positioned relative to said frame such that said zeroing means engages an extended member of said carriage means;
    sensing means for measuring said amplified movement; and
    circuit means for providing an indication of force from the measurement of said amplified movement.

2. The strain measurement device according to claim 1, wherein the length of an elongated portion of said arm member provides a predetermined amplification of said strain movement.

3. The strain measurement device according to claim 2, wherein said zeroing means comprises a threaded mechanism which extends in a generally parallel direction to said elongated portion of said arm member.

4. The strain measurement device according to claim 2, wherein said sensing means includes a first element mounted generally at the free end of said elongated portion of said arm member, and a second element mounted to said frame such that said second element is approximately opposed to said first element.

5. The strain measurement device according to claim 4, wherein said first element is a magnetic element, and said second element is a transducer capable of sensing the strength of the magnetic field produced by said magnetic element.

6. The strain measurement device according to claim 5, wherein said magnetic element is a permanent magnet, and said transducer is a linear output hall effects transducer.

7. The strain measurement device according to claim 6, wherein said circuit means is mounted on a common base with said linear output hall effects transducer.

8. The strain measurement device according to claim 7, wherein said circuit means includes potentiometer means for providing a zero output from said circuit means for an unstrained condition.

9. The strain measurement device according to claim 8, wherein said circuit means includes amplification means for calibrating the signal produced by said linear output hall effects transducer into an indication of force.

10. The strain measurement device according to claim 9, wherein said circuit means includes meter means for providing a display of the force measured by said sensing means.

* * * * *

UNITED STATES PATENT AND TRADEMARK OFFICE
CERTIFICATE OF CORRECTION

PATENT NO. : 4,825,701

DATED : May 2, 1989

INVENTOR(S) : Roger A. Holtslander

It is certified that error appears in the above-identified patent and that said Letters Patent is hereby corrected as shown below:

Column 2, line 14, "for" should be --from--;

Column 2, line 42, "cross-sectional" should be --cross-section--;

Column 6, line 2, "accordigly" should be --accordingly--;

Column 6, line 38, "with" should be --without--.

Signed and Sealed this

Sixth Day of March, 1990

*Attest:*

JEFFREY M. SAMUELS

*Attesting Officer*     *Acting Commissioner of Patents and Trademarks*